US012320476B1

(12) United States Patent
Zheng

(10) Patent No.: US 12,320,476 B1
(45) Date of Patent: Jun. 3, 2025

(54) DETACHABLE LED LAMP DEVICE

(71) Applicant: Junhua Zheng, Shantou (CN)

(72) Inventor: Junhua Zheng, Shantou (CN)

( * ) Notice: Subject to any disclaimer, the term of this patent is extended or adjusted under 35 U.S.C. 154(b) by 0 days.

(21) Appl. No.: 18/937,443

(22) Filed: Nov. 5, 2024

(51) Int. Cl.

| | |
|---|---|
| ***F21L 4/00*** | (2006.01) |
| ***F21K 9/238*** | (2016.01) |
| ***F21S 9/02*** | (2006.01) |
| ***F21V 21/40*** | (2006.01) |

(52) U.S. Cl.
CPC ................ *F21K 9/238* (2016.08); *F21L 4/00* (2013.01); *F21S 9/02* (2013.01); *F21V 21/40* (2013.01)

(58) Field of Classification Search
CPC ....... F21L 4/04; F21L 4/045; F21K 9/23–238; F21S 9/00–046; F21V 21/40; F21V 21/406
See application file for complete search history.

(56) References Cited

U.S. PATENT DOCUMENTS

2020/0124240 A1 * 4/2020 Jeong ..................... F21V 3/026

* cited by examiner

*Primary Examiner* — Sean P Gramling
(74) *Attorney, Agent, or Firm* — Birchwood IP

(57) ABSTRACT

A detachable LED lamp device is provided, which includes a lamp head, a fixing member, a first magnetic component, a lamp holder, a second magnetic component, a battery, an illuminator, a circuit board, and a light-emitting component. The light-emitting component can be replaced without a need to disassemble the lamp head, through a combination of the first and second magnetic components, it is easy to maintain and able to adapt to different lighting needs. By a cooperation between an installation slot and an installation part, different illuminators can be quickly replaced according to needs so as to achieve different lighting effects. By providing a handle and the battery, the LED lamp can be illuminated without external power supply. It can be carried by hand for mobile lighting or fixed in positions without external power supply, rendering it more convenient and flexible to use, and increasing its applicability.

10 Claims, 13 Drawing Sheets

DETACHABLE LED LAMP DEVICE

TECHNICAL FIELD

The present disclosure relates to the field of light-emitting device technologies, and in particular, to a detachable LED lamp device.

BACKGROUND

LED lights refer to lamps that use light-emitting diodes (LEDs) as light sources, typically made of semiconductor LEDs.

At present, in related technologies, the LED lights are mostly designed as a whole, which renders it inconvenient to replace LED lights. When replacement is needed, the entire LED light needs to be replaced.

SUMMARY

The present application aims to solve at least one of the above-mentioned technical problems by providing a detachable LED lamp device to ensure an effect of improving the convenience of LED lamp replacement and enhancing the portability of the LED lamp.

The detachable LED lamp device provided in the present application adopts the following technical solution.

The detachable LED lamp device including a lamp head, a fixing member, a first magnetic component, a lamp holder, a second magnetic component, a battery, an illuminator, a circuit board, and a light-emitting component;

- the lamp head is fixedly connected to the fixing member and located at a top of the fixing member; the first magnetic component is fixedly connected to the fixing member and located at a bottom of the fixing member; the fixing member is connected to the lamp holder; the lamp holder is connected to the illuminator; the battery, the circuit board, and the light-emitting component are located in an enclosed space formed by the lamp holder and the illuminator after the lamp holder is connected to the illuminator; the second magnetic component is located in the lamp holder; the light-emitting component is electrically connected to the circuit board;
- the lamp holder includes a lamp shell, and the lamp shell is provided with a reinforcement part, a connection part, a button fixing member, an interface cover fixing member, an installation space, and an installation slot;
- where the reinforcement part includes a first reinforcement member, a second reinforcement member, a third reinforcement member, a fourth reinforcement member, a fifth reinforcement member, and a sixth reinforcement member.

In some embodiments of the present application, the first reinforcement member and the second reinforcement member are close to the interface cover fixing member; the fifth reinforcement member and the sixth reinforcement member are close to the button fixing member; the third reinforcement member and the fourth reinforcement member are located in a middle of the lamp shell; a position of the first reinforcement member is corresponded to a position of the second reinforcement member; a position of the third reinforcement member is corresponded to a position of the fourth reinforcement member; and a position of the fifth reinforcement member is corresponded to a position of the sixth reinforcement member.

In some embodiments of the present application, the connection part includes a first connector and a second connector, the first connector and the second connector are fixedly connected to the circuit board.

In some embodiments of the present application, the lamp holder further includes a button, an interface cover, a handle, a first clamp block, and a second clamp block; the handle is rotatably connected to the lamp shell; the button, the interface cover, the handle, the first clamp block, and the second clamp block are connected to the lamp shell.

In some embodiments of the present application, the handle is provided with a first curved portion, a recessed portion, and a second curved portion, the recessed portion is located between the first curved portion and the second curved portion, the first curved portion is connected to the recessed portion, and the recessed portion is connected to the second curved portion; a position of the recessed portion is corresponded to a position that is between the first clamp block and the second clamp block.

In some embodiments of the present application, a socket is provided on the circuit board, and a position of the socket is corresponded to a position of the interface cover; the socket is connected to the circuit board and the battery.

In some embodiments of the present application, the installation slot is connected to the illuminator, the illuminator is provided with an installation part that is corresponded to a shape of the installation slot at a position where the installation slot is connected.

In some embodiments of the present application, the interface cover fixing member is configured to fix the interface cover, and the button fixing member is configured to fix the button.

In some embodiments of the present application, a second magnetic component is provided in the installation space, and the lamp shell is further provided with a battery slot.

In some embodiments of the present application, the battery slot is configured to fixedly install the battery.

In summary, the present application includes at least one beneficial technical effect as follows.

1. By a cooperation between the first and second magnetic components, the illuminator can be replaced without disassembling the lamp head. Which is easy to maintain and able to adapt to different lighting needs.

2. By a cooperation between the installation slot and the installation part, different illuminators can be quickly replaced according to needs so as to achieve different lighting effects.

3. By providing the handle and the battery, the LED lamp can be illuminated without external power supply. It can be carried by hand for mobile lighting or fixed in positions without external power supply, rendering it more convenient and flexible to use, and increasing the applicability.

4. By cooperation between the magnetic components, it is easy to replace the lamp head and adapt to the needs of different lamp head standards.

NUMERAL REFERENCE

Figure 1:
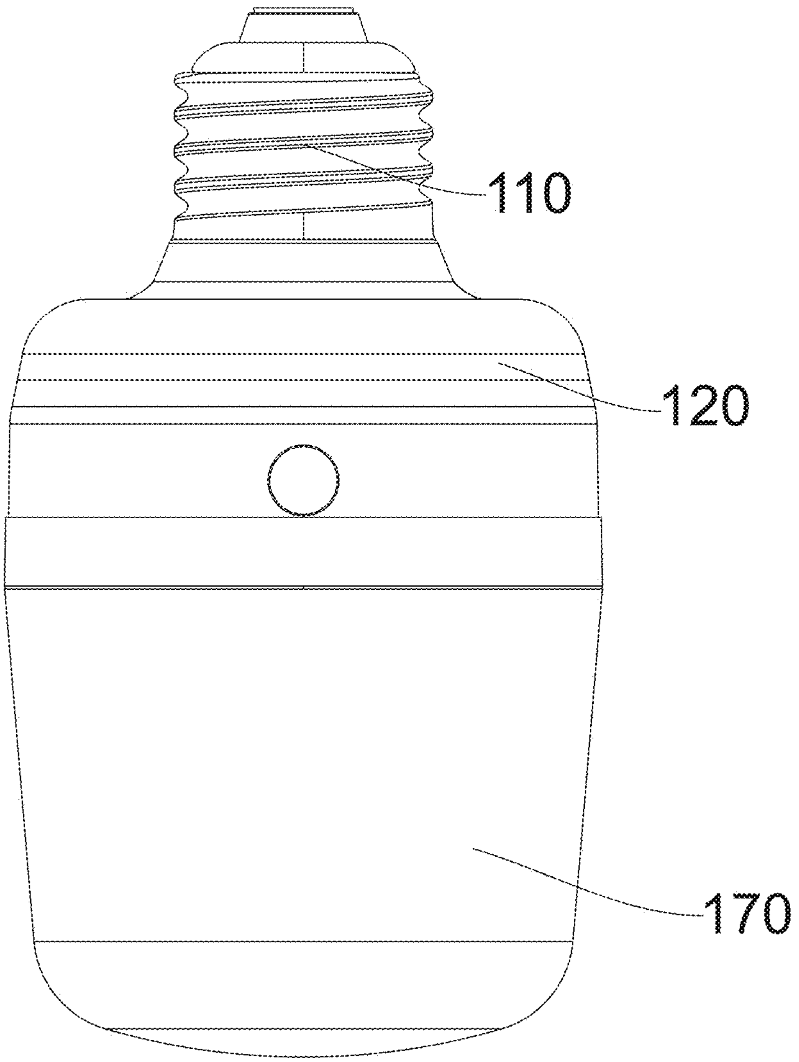
FIG. 1 is a schematic structural diagram of a detachable LED lamp device according to an embodiment of the present application.
Figure 2:
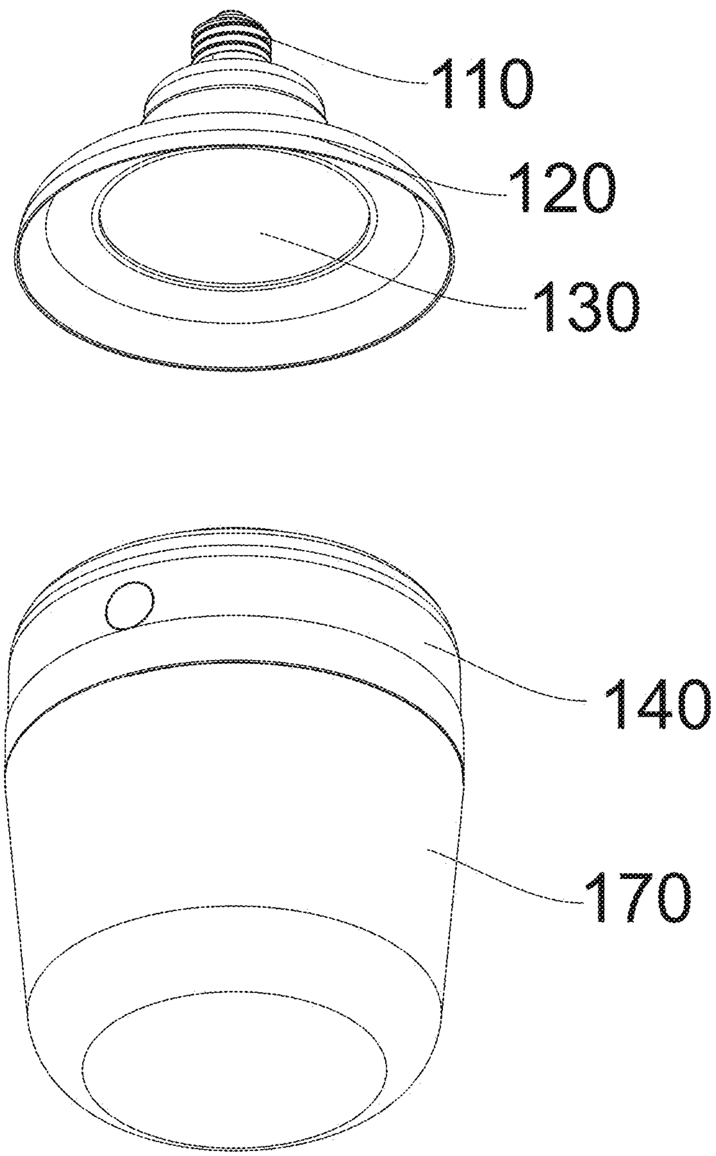
FIG. 2 is a first exploded schematic diagram of the detachable LED lamp device according to an embodiment of the present application.
Figure 3:
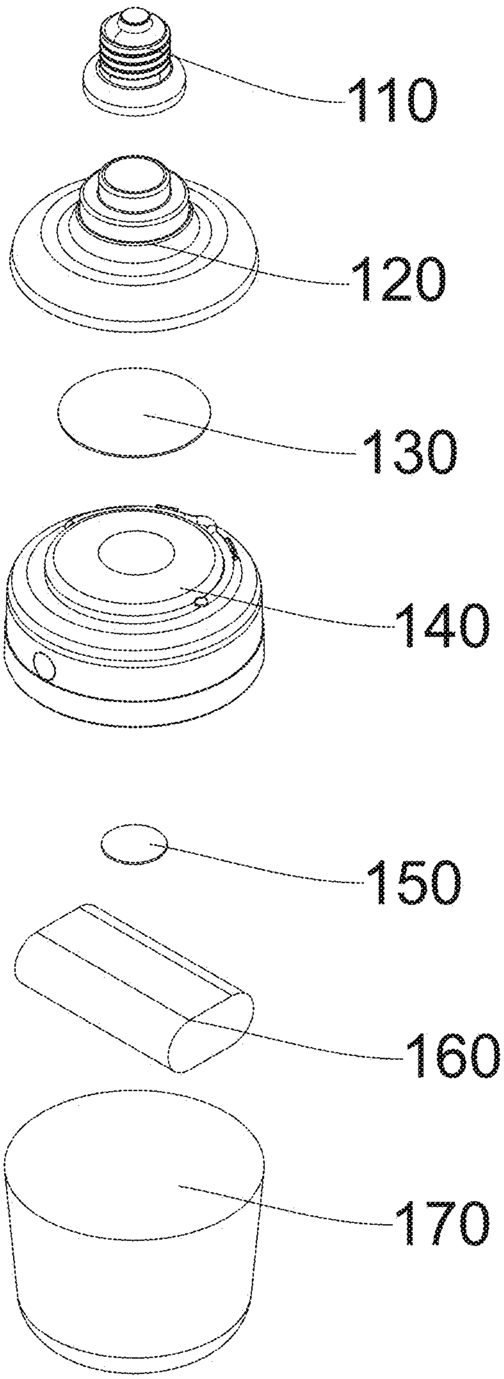
FIG. 3 is a second exploded schematic diagram of the detachable LED lamp device according to an embodiment of the present application.

110—lamp head; 120—fixing member; 130—first magnetic component; 140—lamp holder; 141—lamp shell; 1411—reinforcement part; 14111—first reinforcement member; 14112—second reinforcement member; 14113—third reinforcement member; 14114—fourth reinforcement member; 14115—fifth reinforcement member; 14116—sixth reinforcement member; 1412—connection part; 14121—first connector; 14122—second connector; 1413—button fixing member; 1414—interface cover fixing member; 1415—internal plan; 1416—installation space; 1417—circular surface; 1418—installation slot; 1419—battery slot; 142—button; 143—interface cover; 144—handle; 1441—first curved portion; 1442—recessed portion; 1443—second curved portion; 145—first clamp block; 146—second clamp block; 150—second magnetic component; 160—battery; 170—illuminator.

DESCRIPTION OF EMBODIMENTS

The following will provide a clear and complete description of the technical solution in the embodiments of the present application, combined with the accompanying drawings. Obviously, the described embodiments are only a part of the embodiments of the present application, not all of them. Based on the embodiments in the present application, all other embodiments obtained by those skilled in the art without creative work are within the protection scope of the present application.

An embodiment of the present application discloses a detachable LED lamp device. Referring to FIGS. 1-11, it can be understood that the detachable LED lamp device includes a lamp head 110, a fixing member 120, a first magnetic component 130, a lamp holder 140, a second magnetic component 150, a battery 160, an illuminator 170, a circuit board (not shown in the figure), and a light-emitting component (not shown in the figure).

The lamp head 110 is fixedly connected to the fixing member 120 and located at a top of the fixing member 120. The first magnetic component 130 is fixedly connected to the fixing member 120 and located at a bottom of fixing member 120. The fixing member 120 is connected to the lamp holder 140. The lamp holder 140 is connected to the illuminator 170; the battery 160, the circuit board (not shown in the figure), and the light-emitting component (not shown in the figure) are located in an enclosed space formed by the lamp holder 140 and the illuminator 170 after the lamp holder 140 is connected to the illuminator 170. The second magnetic component 150 is located in the lamp holder 140.

The lamp head 110 is electrically connected to the circuit board (not shown in the figure), the light-emitting component (not shown in the figure) is electrically connected to the circuit board (not shown in the figure), and the lamp head 110 is further electrically connected to the battery 160. The lamp head 110 can supply power to the battery 160, the circuit board (not shown in the figure), and the light-emitting component (not shown in the figure), and the battery 160 can supply power to the circuit board (not shown in the figure) and the light-emitting component (not shown in the figure). Light emitted by the light-emitting component (not shown in the figure) is emitted to an outside through the illuminator 170.

The fixing member 120 is connected to the lamp holder 140 through a cooperation of the first magnetic component 130 and the second magnetic component 150. The second magnetic component 150 can be a magnetic material or a metal material that can be magnetically attracted by the first magnetic component 130.

It can be understood that the specific material of the second magnetic component 150 in this embodiment is not limited, and only needs to be magnetically attracted by the first magnetic component 130.

By the cooperation between the first magnetic component 130 and the second magnetic component 150, the light-emitting component (not shown in the figure) can be replaced without disassembling the lamp head 110. When the light-emitting component (not shown in the figure) is damaged or not suitable for current lighting needs, the lamp holder 140 can be directly disassembled and replaced with another lamp holder 140 with a normal working light-emitting component (not shown in the figure) or one lamp holder 140 with one light-emitting component that meets the requirements (not shown in the figure). Which is easy to maintain and able to adapt to different lighting needs.

Figure 4:
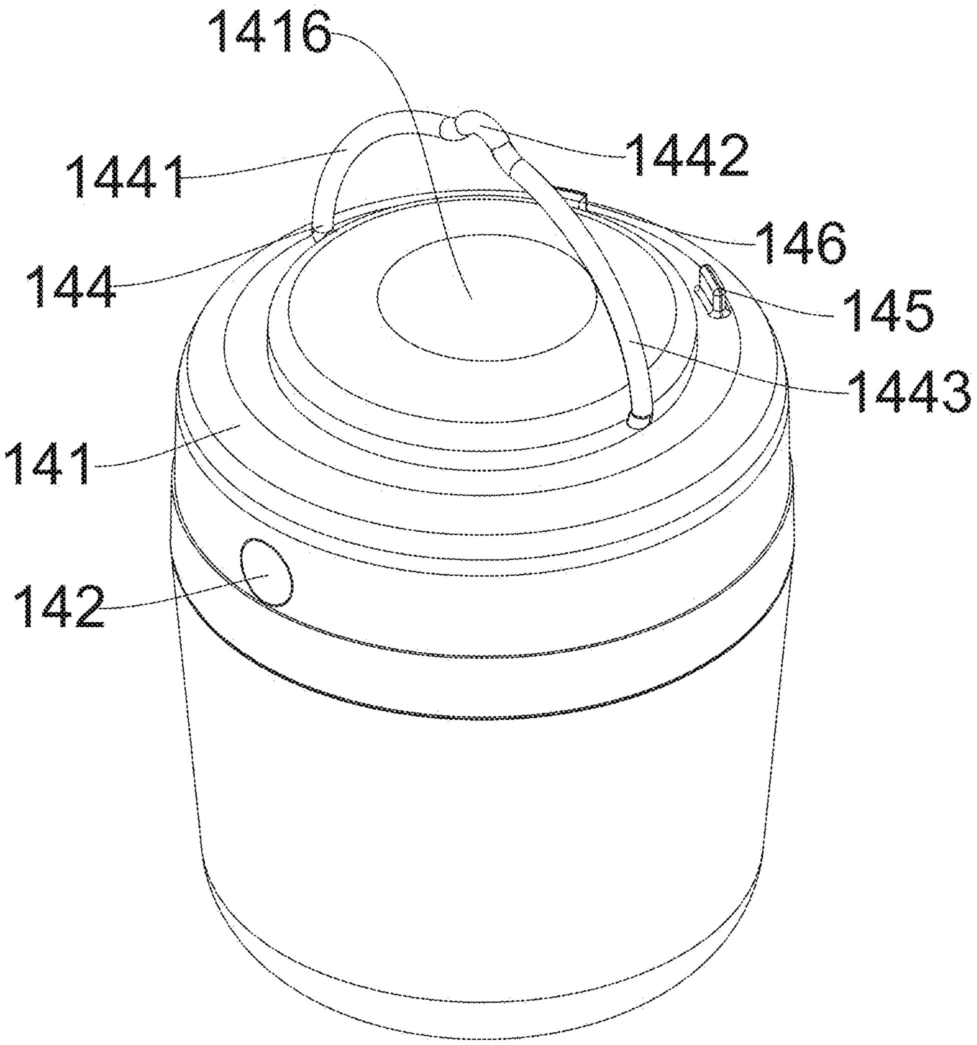
FIG. 4 is a schematic diagram of an operation of a lamp holder in an embodiment of the present application.
Figure 5:
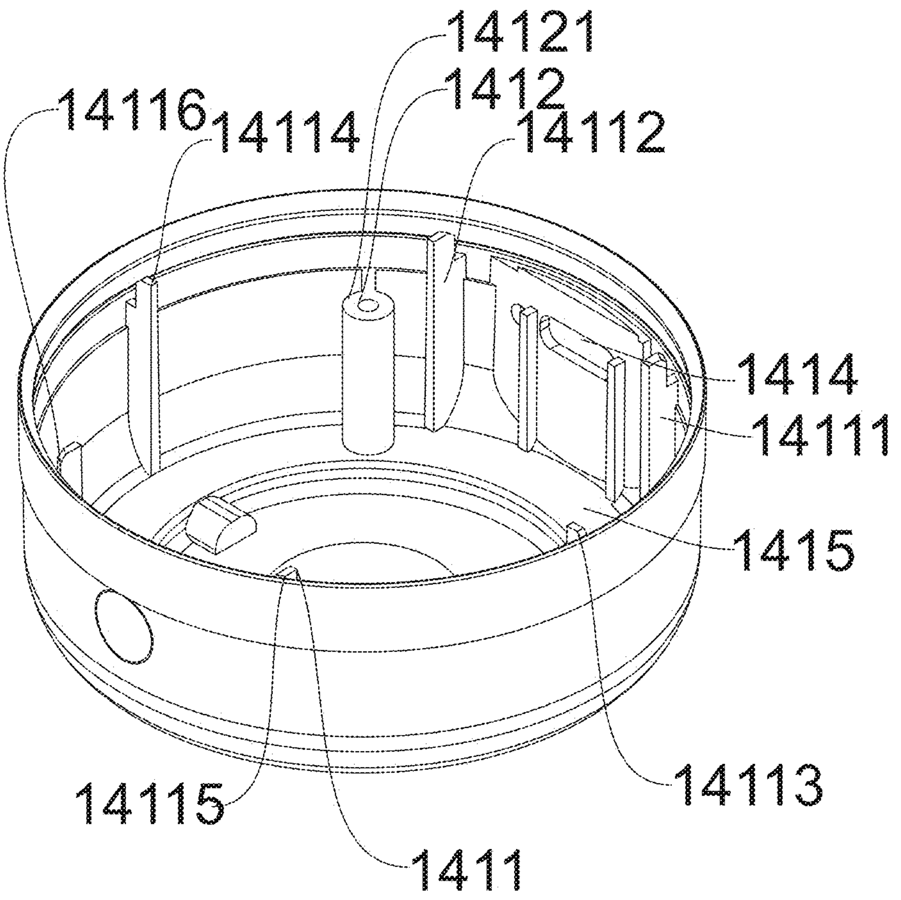
FIG. 5 is a first schematic structural diagram of the lamp holder in an embodiment of the present application.
Figure 6:
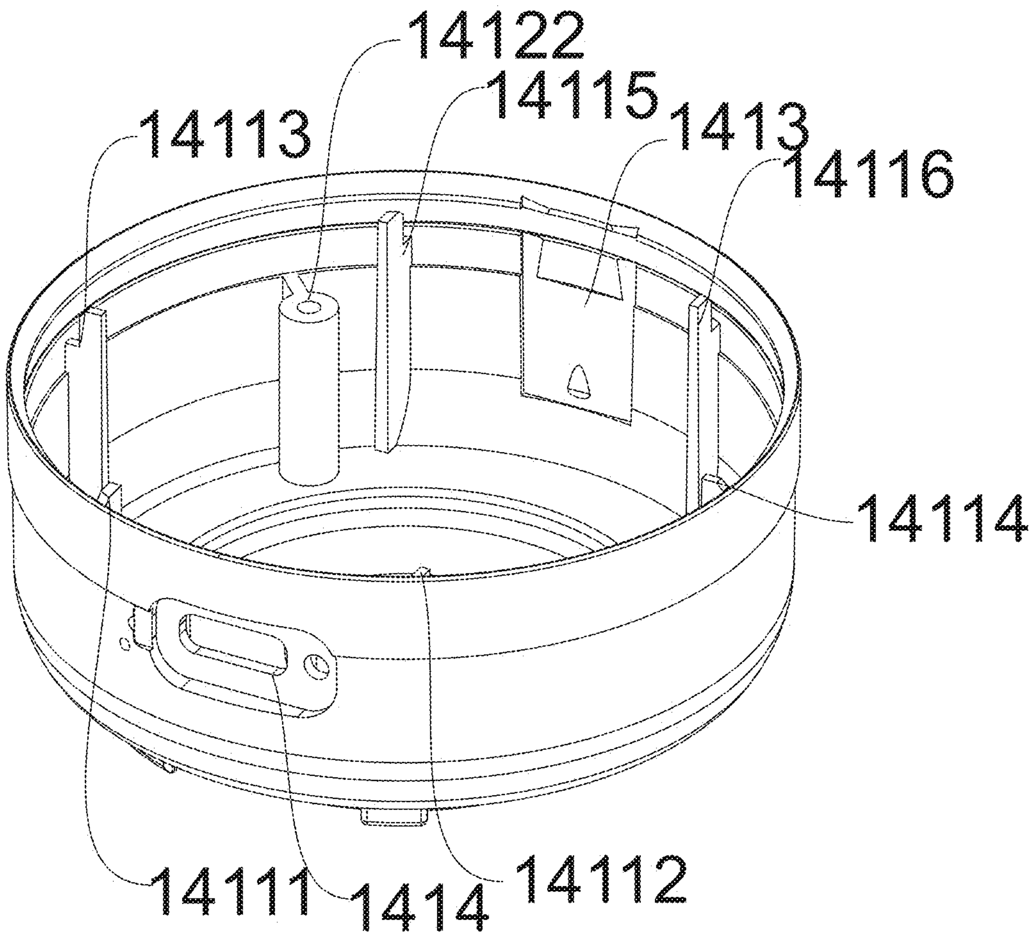
FIG. 6 is a second structural diagram of the lamp holder in an embodiment of the present application.
Figure 7:
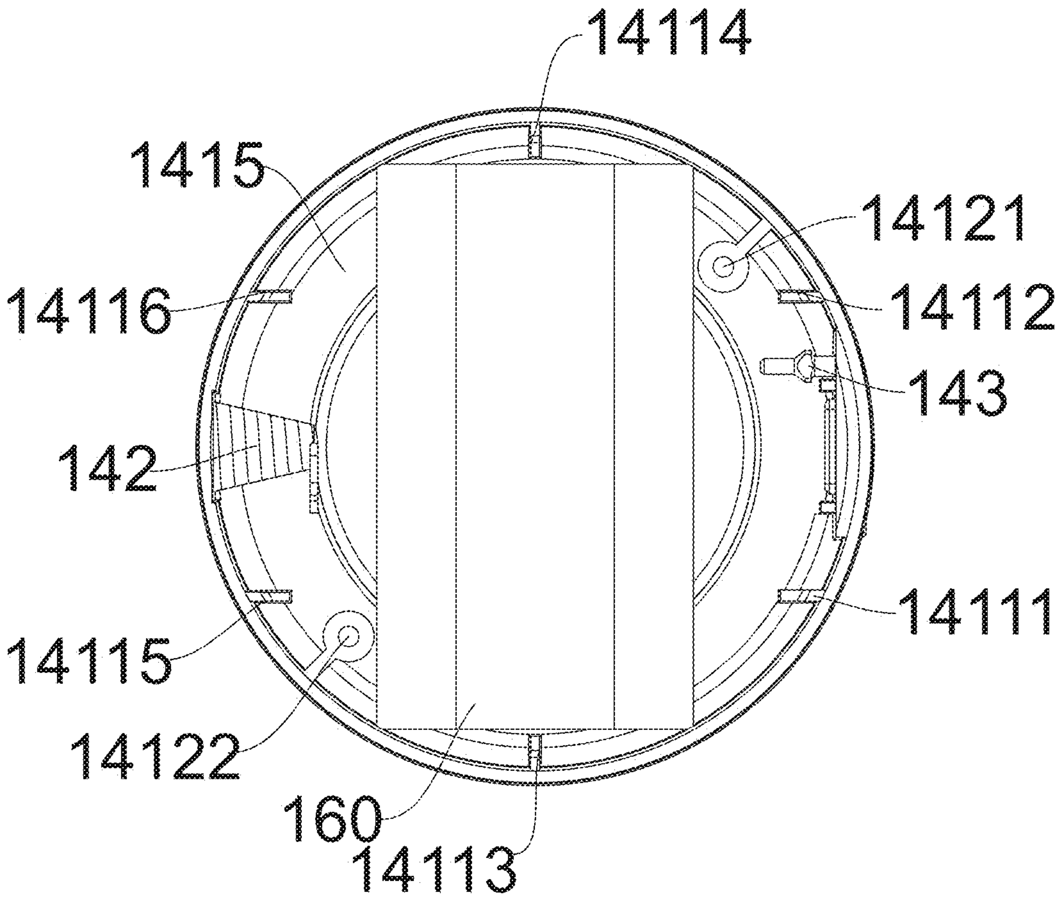
FIG. 7 is an internal schematic diagram of the detachable LED lamp device according to an embodiment of the present application.
Figure 8:
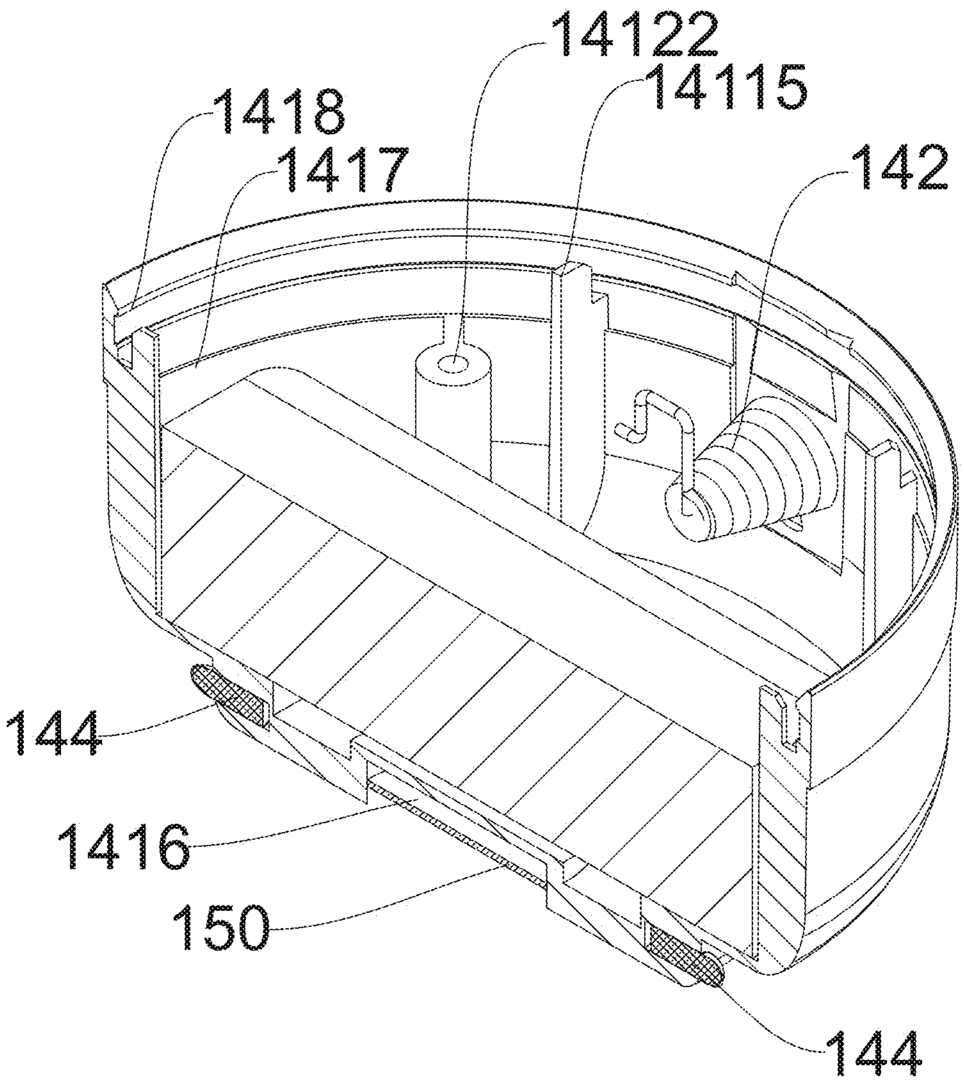
FIG. 8 is an internal sectional schematic diagram of the detachable LED lamp device according to an embodiment of the present application.

Further referring to FIGS. 4 and 7, it can be understood that the lamp holder 140 includes a lamp shell 141, a button 142, an interface cover 143, a handle 144, a first clamp block 145, and a second clamp block 146. The handle 144 is rotatably connected to the lamp shell 141; the button 142, the interface cover 143, the handle 144, the first clamp block 145, and the second clamp block 146 are connected to the lamp shell 141. The button 142 is located on a front of the lamp shell 141, the interface cover 143 is located on a rear of the lamp shell 141; the handle 144, the first clamp block 145, and the second clamp block 146 are located on a top of the lamp shell 141.

It can be understood that the button 142 is connected to the circuit board (not shown in the figure), and a working state of the LED lamp device can be changed through the button 142. The interface cover 143 is used for dust and water resistance.

The handle 144 is provided with a first curved portion 1441, a recessed portion 1442, and a second curved portion 1443; the recessed portion 1442 is located between the first curved portion 1441 and the second curved portion 1443. The first curved portion 1441 is connected to the recessed portion 1442, and the recessed portion 1442 is connected to the second curved portion 1443. The first clamp block 145 and the second clamp block 146 are configured to fix the handle 144 and prevent the handle 144 from being rotated freely on the lamp shell 141. The recessed portion 1442 is convenient for manual extraction. A position of the recessed portion 1442 is corresponded to a position that is between the first clamp block 145 and the second clamp block 146.

By providing the handle 144 and the battery 160, the LED lamp can be illuminated without external power supply. It can be carried by hand for mobile lighting or fixed in a position without external power supply for lighting, rendering it more convenient and flexible to use, and increasing its applicability.

Further referring to FIGS. 5-8, it can be understood that the lamp shell 141 is provided with a reinforcement part 1411, a connection part 1412, a button fixing member 1413, an interface cover fixing member 1414, an internal plane 1415, an installation space 1416, a circular surface 1417, and an installation slot 1418. The reinforcement part 1411 includes a first reinforcement member 14111, a second reinforcement member 14112, a third reinforcement member 14113, a fourth reinforcement member 14114, a fifth reinforcement member 14115, and a sixth reinforcement member 14116. The connection part 1412 includes a first connector 14121 and a second connector 14122.

The interface cover fixing member 1414 is used to fix the interface cover 143, the button fixing member 1413 is used to fix the button 142, the second magnetic component 150 is provided in the installation space 1416, the battery 160 is placed on the internal plane 1415, and the first connector 14121 and the second connector 14122 are used to fix and connect the circuit board (not shown in the figure).

Positions of the first reinforcement member 14111 and the second reinforcement member 14112 are close to the interface cover fixing member 1414, positions of the fifth reinforcement member 14115 and the sixth reinforcement member 14116 are close to the button fixing member 1413, positions of the third reinforcement member 14113 and the fourth reinforcement member 14114 are located in a middle of the lamp shell 141, and the positions of the first reinforcement member 14111, the second reinforcement member 14112, the third reinforcement member 14113, the fourth reinforcement member 14114, the fifth reinforcement member 14115, and the sixth reinforcement member 14116 are symmetrical. That is, a position of the first reinforcement member 14111 is corresponded to a position of the second reinforcement member 14112, a position of the third reinforcement member 14113 is corresponded to a position of the fourth reinforcement member 14114, and a position of the fifth reinforcement member 14115 is corresponded to a position of the sixth reinforcement member 14116.

The reinforcement part 1411 is used to enhance a strength of the lamp shell 141 and is not in contact with the battery 160. A position of the battery 160 is limited by the internal plane 1415, the circuit board (not shown in the figure), and the circular surface 1417.

It can be understood that a socket (not shown in the figure) is provided on the circuit board (not shown in the figure), and a position of the socket (not shown in the figure) corresponds to a position of the interface cover 143. The socket (not shown in the figure) is connected to the circuit board (not shown in the figure) and the battery 160. The socket (not shown in the figure) receives external power to supply power to the circuit board (not shown in the figure) and the battery 160, and can also supply power to the light-emitting component (not shown in the figure) through the circuit board (not shown in the figure).

Figure 9:
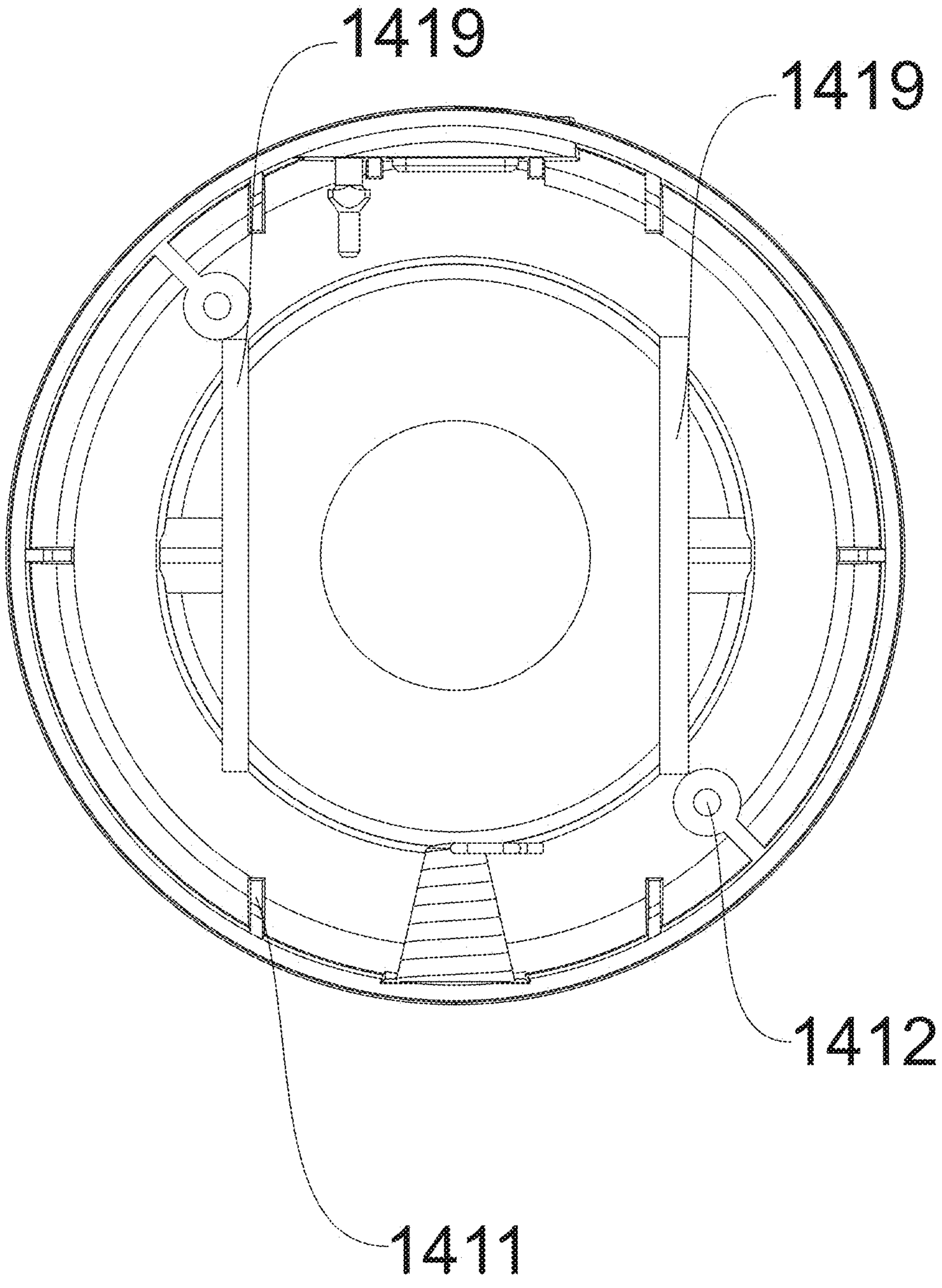
FIG. 9 is a third schematic structural diagram of the lamp holder in an embodiment of the present application.

Further referring to FIG. 9, it can be understood that the lamp shell 141 can also be provided with a battery slot 1419. At this time, the battery 160 is fixedly installed on the battery slot 1419, without a need for the internal plan 1415, the circuit board (not shown in the figure), and the circular surface 1417 to cooperate to limit.

Figure 10:
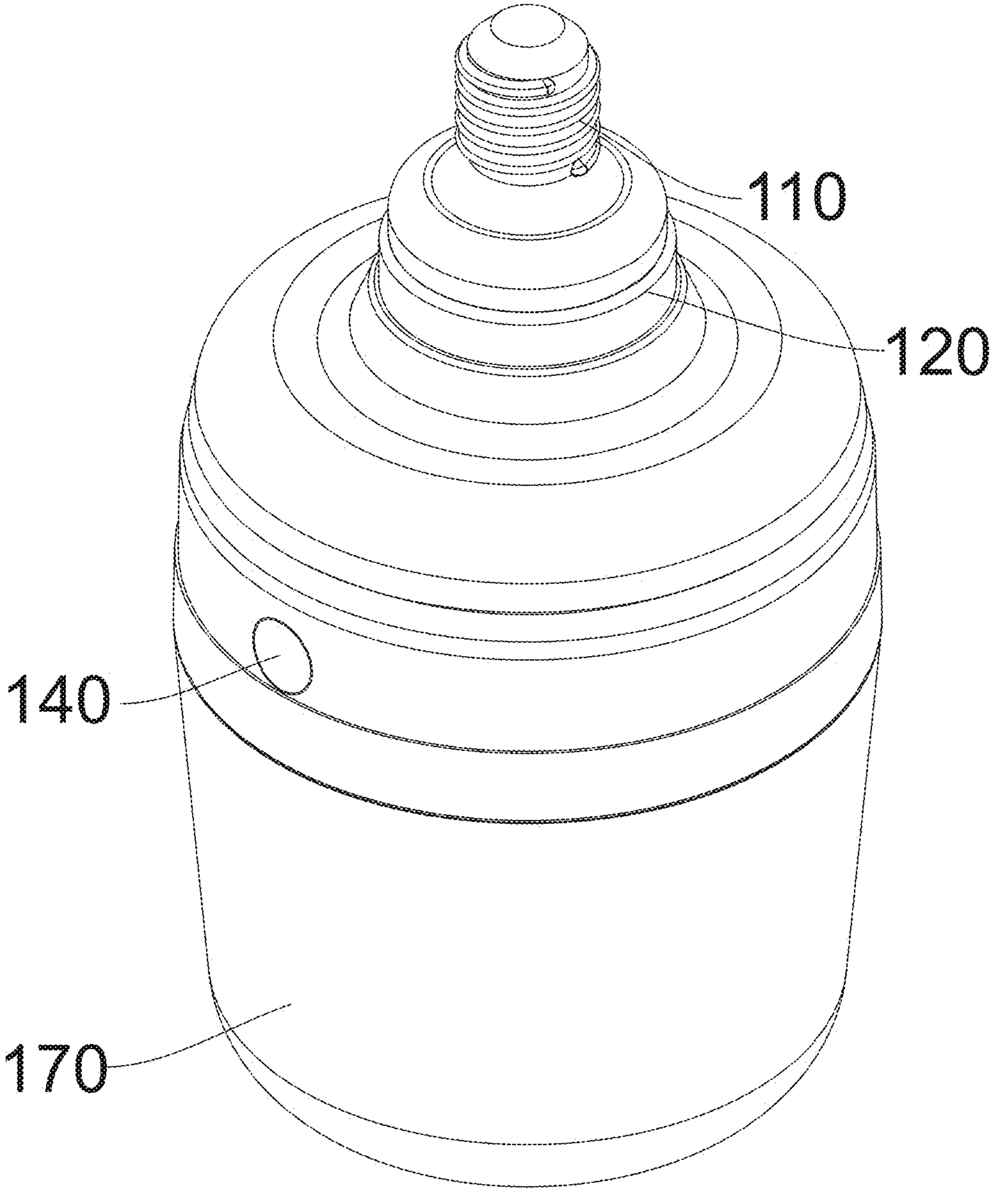
FIG. 10 is a schematic structural diagram of the detachable LED lamp device for replacing the lamp head in an embodiment of the present application.
Figure 11:
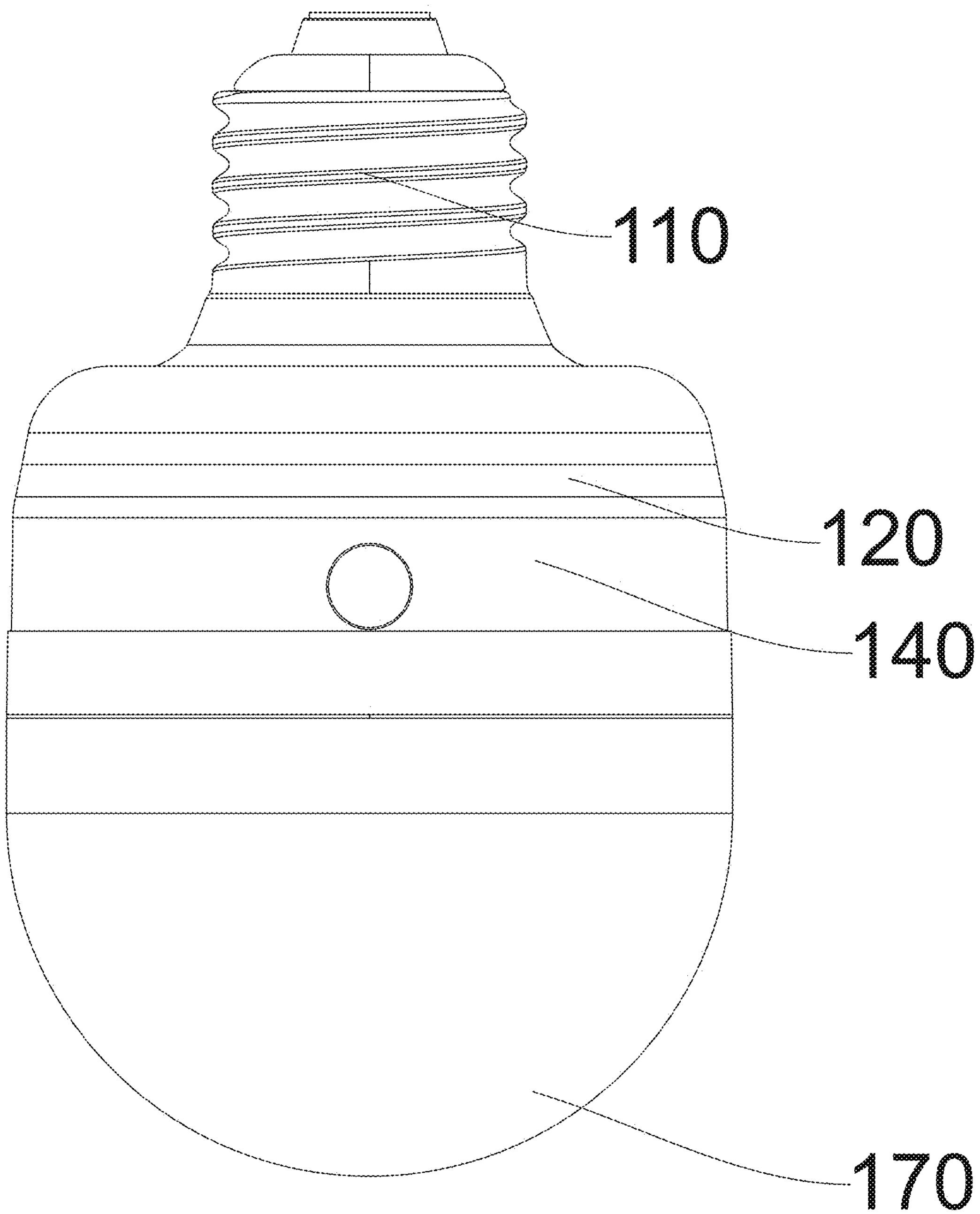
FIG. 11 is a first schematic structural diagram of the detachable LED lamp device for replacing an illuminator in an embodiment of the present application.
Figure 12:
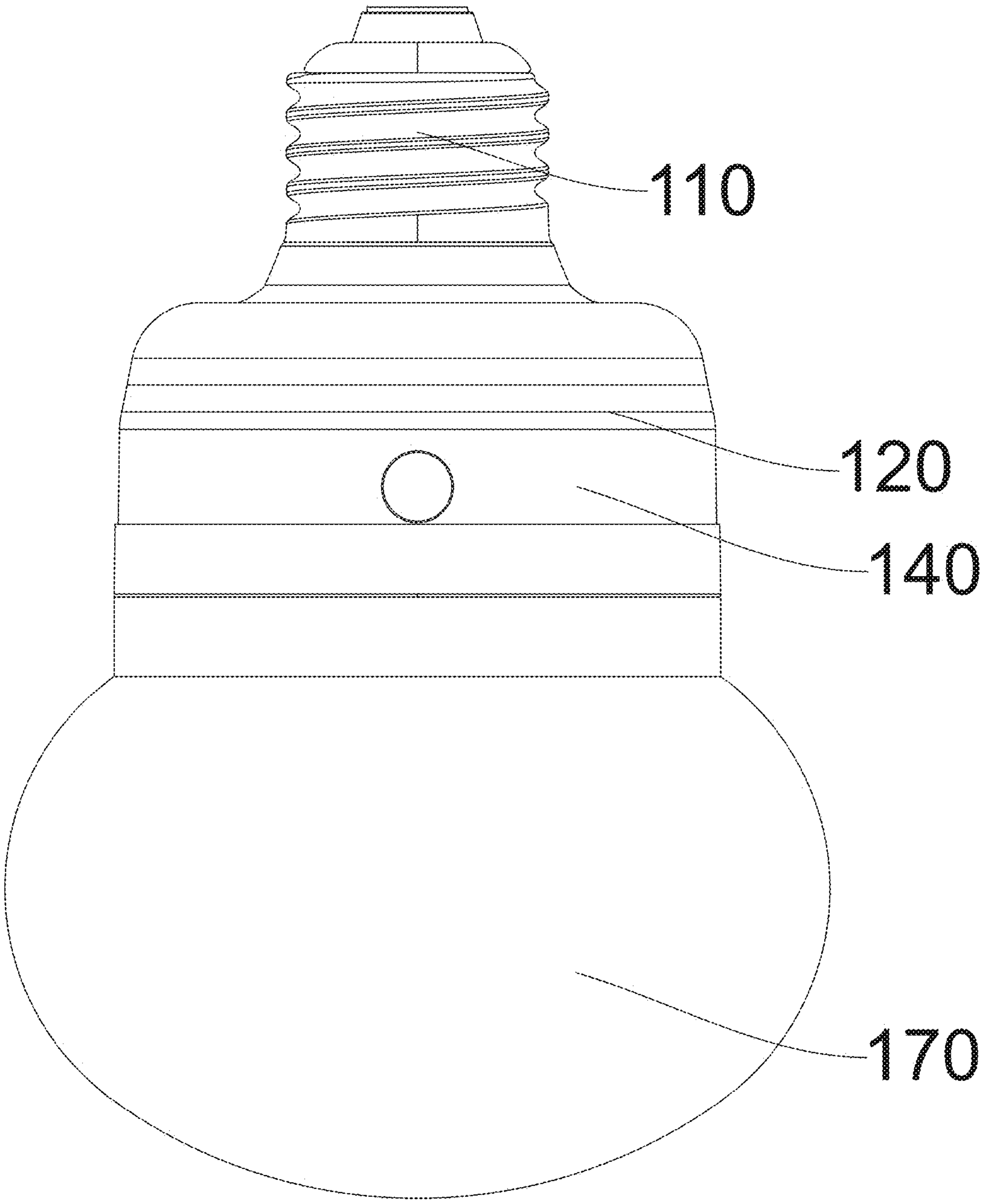
FIG. 12 is a second schematic structural diagram of the detachable LED lamp device for replacing the illuminator in an embodiment of the present application.
Figure 13:
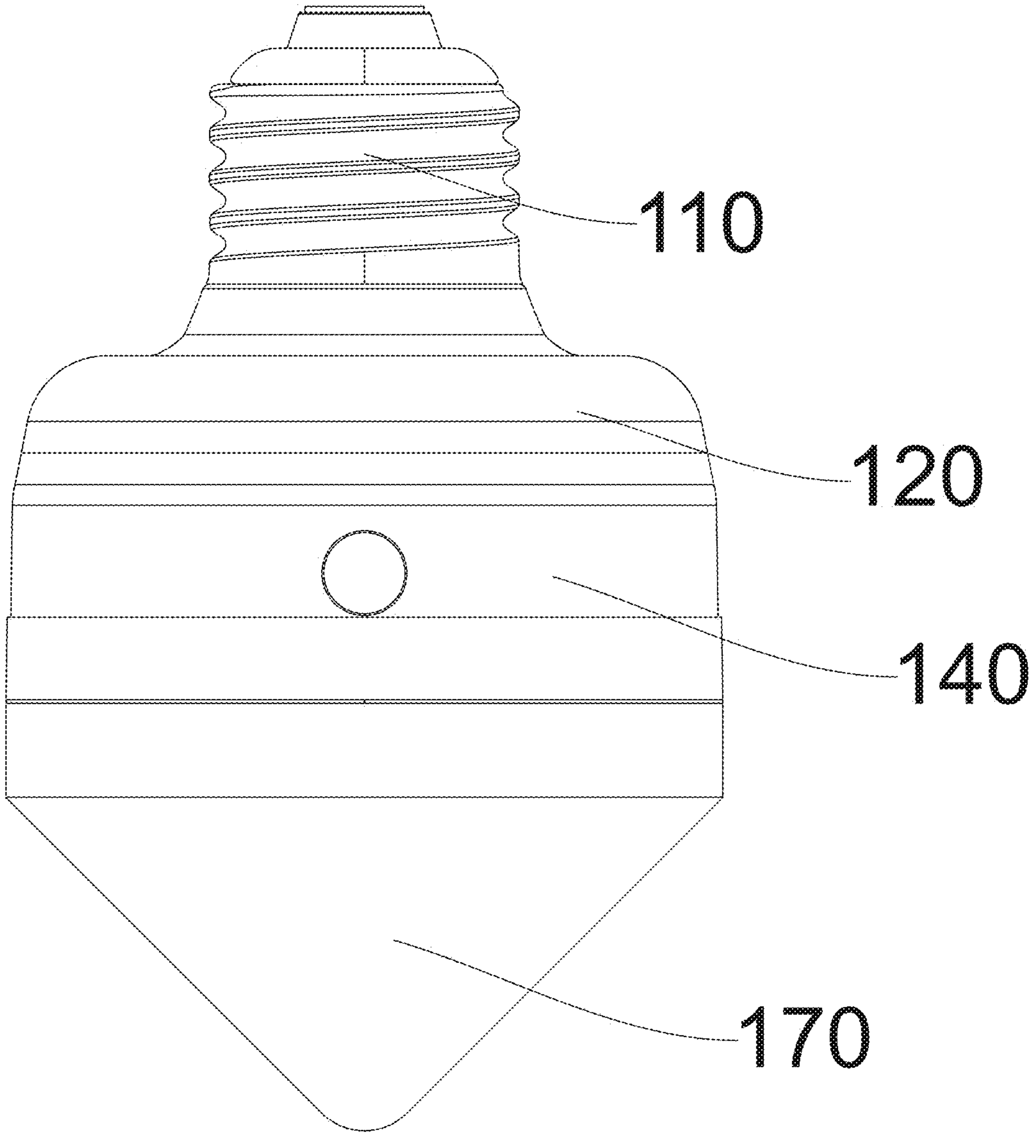
FIG. 13 is a third schematic structural diagram of the detachable LED lamp device for replacing the illuminator in an embodiment of the present application.

Further referring to FIG. 10, it can be understood that by the cooperation between the first magnetic component 130 and the second magnetic component 150, the lamp head 110 can be easily replaced. The fixing member 120 is simply removed and the fixing member 120 that is connected to the required lamp head 110 is replaced. This embodiment of the present application can easily replace the lamp head 110 to meet the requirements of different lamp head 110 standards.

Further referring to FIGS. 8 and 11-13, it can be understood that the installation slot 1418 is connected to the illuminator 170, and a position where the illuminator 170 is connected to the installation slot 1418 is provided with an installation part (not shown in the figure) corresponding to a shape of the installation slot 1418, which facilitates a replacement of different illuminators 170.

It can be understood that changing different illuminators 170 can result in different lighting effects depending on the shape and material. A user can replace different illuminators 170 according to needs In summary, the present application provides a detachable LED lamp device that is easy to maintain and can adapt to different lighting needs by the cooperation between the first magnetic component 130 and the second magnetic component 150. The light-emitting component (not shown in the figure) can be replaced without disassembling the lamp head 110. Which is easy to maintain and able to adapt to different lighting needs. By the cooperation between the first magnetic component 130 and the second magnetic component 150, the lamp head 110 can be easily replaced to meet the requirements of different lamp head 110 standards. By a cooperation between the installation slot 1418 and the installation part (not shown in the figure), different illuminators can be quickly replaced according to needs to achieve different lighting effects. By providing with the handle 144 and battery 160, the LED lamp can be illuminated without external power supply. It can be carried by hand for mobile lighting or fixed in a position without external power supply for lighting, rendering it more convenient and flexible to use, and increasing its applicability.

The above are only implementation modes of the present application and do not limit the scope of the present application. Any equivalent structure or equivalent process transformation made using the content of this specification and drawings, or directly or indirectly applied in other related technical fields, are also included in the protection scope of the present application.

What is claimed is:

1. A detachable LED lamp device, comprising a lamp head, a fixing member, a first magnetic component, a lamp holder, a second magnetic component, a battery, an illuminator, a circuit board, and a light-emitting component;

the lamp head is fixedly connected to the fixing member and located at a top of the fixing member; the first magnetic component is fixedly connected to the fixing member and located at a bottom of the fixing member; the fixing member is connected to the lamp holder; the lamp holder is connected to the illuminator; the battery, the circuit board, and the light-emitting component are located in an enclosed space formed by the lamp holder and the illuminator after the lamp holder is connected to the illuminator; the second magnetic component is located in the lamp holder; the light-emitting component is electrically connected to the circuit board;

the lamp holder comprises a lamp shell, and the lamp shell is provided with a reinforcement part, a connection part, a button fixing member, an interface cover fixing member, an installation space, and an installation slot;

wherein the reinforcement part comprises a first reinforcement member, a second reinforcement member, a third reinforcement member, a fourth reinforcement member, a fifth reinforcement member, and a sixth reinforcement member;

wherein the lamp holder further comprises a button, an interface cover, a handle, a first clamp block, and a second clamp block;

wherein the handle, the first clamp block, and the second clamp block are located on a top of the lamp shell; the first clamp block and the second clamp block are configured to prevent the handle from being rotated freely on the lamp shell.

2. The detachable LED lamp device according to claim 1, wherein the first reinforcement member and the second reinforcement member are close to the interface cover fixing member; the fifth reinforcement member and the sixth reinforcement member are close to the button fixing member; the third reinforcement member and the fourth reinforcement member are located in a middle of the lamp shell;

a position of the first reinforcement member is corresponded to a position of the second reinforcement member; a position of the third reinforcement member is corresponded to a position of the fourth reinforcement member; and a position of the fifth reinforcement member is corresponded to a position of the sixth reinforcement member.

3. The detachable LED lamp device according to claim 2, wherein the connection part comprises a first connector and a second connector, the first connector and the second connector are fixedly connected to the circuit board.

4. The detachable LED lamp device according to claim 1, wherein the handle is rotatably connected to the lamp shell; the button, the interface cover, the handle, the first clamp block, and the second clamp block are connected to the lamp shell.

5. The detachable LED lamp device according to claim 4, wherein the handle is provided with a first curved portion, a recessed portion, and a second curved portion, the recessed portion is located between the first curved portion and the second curved portion, the first curved portion is connected to the recessed portion, and the recessed portion is connected to the second curved portion;

a position of the recessed portion is corresponded to a position that is between the first clamp block and the second clamp block.

6. The detachable LED lamp device according to claim 4, wherein a socket is provided on the circuit board, a position of the socket is corresponded to a position of the interface cover, and the socket is connected to the circuit board and the battery.

7. The detachable LED lamp device according to claim 1, wherein the installation slot is connected to the illuminator, the illuminator is provided with an installation part that is corresponded to a shape of the installation slot at a position where the installation slot is connected.

8. The detachable LED lamp device according to claim 4, wherein the interface cover fixing member is configured to fix the interface cover, and the button fixing member is configured to fix the button.

9. The detachable LED lamp device according to claim 4, wherein the second magnetic component is provided in the installation space, and the lamp shell is further provided with a battery slot.

10. The detachable LED lamp device according to claim 9, wherein the battery slot is configured to fixedly install the battery.

* * * * *